United States Patent [19]

Han et al.

[11] Patent Number: 5,149,516

[45] Date of Patent: Sep. 22, 1992

[54] PARTIAL OXIDATION OF METHANE OVER PEROVSKITE CATALYST

[75] Inventors: Scott Han, Lawrenceville, N.J.; Lorenzo C. DeCaul, Chester, Pa.; Robert E. Palermo, Bloomfield, N.J.; Dennis E. Walsh, Richboro, Pa.

[73] Assignee: Mobil Oil Corp., Fairfax, Va.

[21] Appl. No.: 597,219

[22] Filed: Oct. 15, 1990

[51] Int. Cl.$^5$ .............. C01B 31/18; C01B 3/26
[52] U.S. Cl. .............. 423/415 A; 252/373; 423/651; 502/525
[58] Field of Search ........... 423/415 A, 651, 650, 423/648.1; 502/525; 252/373

[56] References Cited

U.S. PATENT DOCUMENTS

| | | | |
|---|---|---|---|
| 4,009,242 | 2/1977 | Lauder et al. | 502/525 |
| 4,140,655 | 2/1979 | Chabot et al. | 502/525 |
| 4,363,361 | 12/1982 | Madgaukar et al. | 423/245.2 |
| 4,522,706 | 6/1985 | Wheelock et al. | 502/525 |
| 4,897,253 | 1/1990 | Jenkins | 423/651 |

OTHER PUBLICATIONS

*Nature*, vol. 344, "Selective Oxidation of Methane to Synthesis Gas Using Transition Metal Catalysts", Ashcroft et al., Mar. 22, 1990, pp. 319-321.

"New Powerful Catalysts for Methane Conversion", pp. 5 & 6, Mar. 26, 1990, Chemical and Engineering News (C&EN).

*Primary Examiner*—Michael Lewis
*Assistant Examiner*—Stephen G. Kalinchak
*Attorney, Agent, or Firm*—Alexander J. McKillop; Charles J. Speciale; Edward F. Kenehan, Jr.

[57] ABSTRACT

There is provided a process for the partial oxidation of methane to produce a product including carbon monoxide and hydrogen. The process involves contacting a source of methane and a source of oxygen with a perovskite catalyst, such as $LaCoO_3$.

14 Claims, No Drawings

PARTIAL OXIDATION OF METHANE OVER PEROVSKITE CATALYST

BACKGROUND

There is provided herein a process for the partial oxidation of methane over a perovskite catalyst to produce a mixture of carbon monoxide and hydrogen.

Natural gas in an abundant fossil fuel resource. Recent estimates places worldwide natural gas reserves at about $35 \times 10^{14}$ standard cubic feet, corresponding to the energy equivalent of about 637 billion barrels of oil.

The composition of natural gas at the wellhead varies but the major hydrocarbon present is methane. For example the methane content of natural gas may vary within the range of from about 40 to 95 vol. %. Other constituents of natural gas may include ethane, propane, butanes, pentane (and heavier hydrocarbons), hydrogen sulfide, carbon dioxide, helium and nitrogen.

Natural gas is classified as dry or wet depending upon the amount of condensable hydrocarbons contained in it. Condensable hydrocarbons generally comprise $C_3+$ hydrocarbons although some ethane may be included. Gas conditioning is required to alter the composition of wellhead gas, processing facilities usually being located in or near the production fields. Conventional processing of wellhead natural gas yields processed natural gas containing at least a major amount of methane.

Processed natural gas, consisting essentially of methane, (typically 85-95 volume percent) may be directly used as clean burning gaseous fuel for industrial heat and power plants, for production of electricity, and to fire kilns in the cement and steel industries. It is also useful as a chemicals feedstock, but large-scale use for this purpose is largely limited to conversion to synthesis gas which in turn is used for the manufacture of methanol and ammonia. It is notable that for the foregoing uses no significant refining is required except for those instances in which the wellhead-produced gas is sour, i.e., it contains excessive amounts of hydrogen sulfide. Natural gas, however, has essentially no value as a portable fuel at the present time. In liquid form, it has a density of 0.415 and a boiling point of minus 162° C. Thus, it is not readily adaptable to transport as a liquid except for marine transport in very large tanks with a low surface to volume ratio, in which unique instance the cargo itself acts as refrigerant, and the volatilized methane serves as fuel to power the transport vessel. Large-scale use of natural gas often requires a sophisticated and extensive pipeline system.

A significant portion of the known natural gas reserves is associated with fields found in remote, difficulty accessible regions. For many of these remote fields, pipelining to bring the gas to potential users is not economically feasible.

Indirectly converting methane to methanol by steam-reforming to produce synthesis gas as a first step, followed by catalytic synthesis of methanol is a well-known process. The Mobil Oil Process, developed in the last decade provides an effective means for catalytically converting methanol to gasoline, e.g. as described in U.S. Pat. No. 3,894,107 to Butter et al. Although the market for gasoline is huge compared with the market for methanol, and although this process is currently used in New Zealand, it is complex and its viability appears to be limited to situations in which the cost for supplying an alternate source of gasoline is exceptionally high. There evidently remains a need for other ways to convert natural gas to higher valued and/or more readily transportable products.

Methane can be upgraded to more valuable products by partially oxidizing methane to produce a mixture of carbon monoxide and hydrogen. This partial oxidation of methane may take place thermally, in the absence of a catalyst, at high temperatures of greater than 1200 degrees C. Conversion of methane as described herein could reduce costs associated with steam reforming to produce carbon monoxide and hydrogen.

SUMMARY

There is provided herein a process for the partial oxidation of methane, said process comprising contacting a source of methane and a source of oxygen with a perovskite of the formula $ABO_3$, where A is at least one metal atom capable of occupying the 12-coordinate sites of the perovskite and B is at least one metal atom capable of occupying the 6-coordinate sites of the perovskite, wherein methane and oxygen are contacted with said perovskite under conditions sufficient to convert said methane and oxygen to a mixture of carbon monoxide and hydrogen.

EMBODIMENTS

Suitable sources of methane include natural gas or methane separated from natural gas. Suitable sources of oxygen include air or oxygen separated from air.

The ratio of methane to oxygen in the reactant may vary from about 1:1 to about 100:1 by volume.

The reaction conditions for conducting the partial oxidation of methane over the perovskite catalyst may include a temperature of from about 600° C. to about 900° C.; a pressure of from about 0.1 atm to about 100 atm; and a gas hourly space velocity (GHSV) of from about 100 to about 300,000 $hr^{-1}$ GHSV is defined as the volumetric hourly feed rate of methane and oxygen measured normally at NTP divided by the catalyst volume (i.e. the volume of perovskite). It will be understood that NTP refers to room temperature (i.e. about 25° C.) and atmospheric pressure.

The mole ratio of carbon monoxide to hydrogen in the product may be from about 1.0 to about 4.0. The conversion of methane may be from about 0.1 % to about 95% or even greater than 95%. The weight ratio of carbon dioxide produced to carbon monoxide produced may be from about 0 to 0.5.

Many oxides, having a large variety of elemental constituents, have the structure of perovskites. The term, perovskite, as used herein refers to such materials having essentially the crystal structure of the mineral perovskite ($CaTiO_3$) without limitation to the elemental constituents thereof. More particularly, the perovskites referred to herein may be represented by the formula, $ABO_3$, where A and B can be a variety of elements. Examples of A include La, Ca, Sr, Ba, Na, K, Ag, Cd and mixtures thereof. Examples of B include Ta, Co, Ti, Ga, Nb, Fe, Ni, Mn, Cr, V, Th, Pb, Sn, Mo, Zr and mixtures thereof. The perovskite crystal structure of these materials may be confirmed by X-ray diffraction analysis of these materials. Materials which have essentially the crystal structure of perovskites are those which have the basic perovskite structure allowing for minor defects or imperfections, such as those commonly observed for such materials.

The following terms are defined. Methane conversion: the percentage of carbon atoms in the feed converted to other products. $O_2$ conversion: the percentage of oxygen atoms in the feed converted to other products. The carbon selectivity to a particular species is defined in the following manner: CO carbon selectivity is the percentage of carbon atoms derived from converted methane that end up as CO. $C_{2+}$ selectivity: percentage of carbon atoms derived from converted methane which ends up as $C_2H_6, C_2H_4, C_3H_8, C_3H_6, \ldots$ (i.e. higher hydrocarbons). Carbon selectivities to $CO_2$ and coke are defined analogously. The oxygen selectivities to various products are similarly defined, based on converted feed oxygen.

EXAMPLE

The perovskite $LaCoO_3$ was prepared by $NH_3(NH_4)_2CO_3$ precipitation of the metal ions from a solution of the nitrates; the supernatant of the suspension was evaporated and the resulting mass calcined at 950° C. Composition of the final catalyst was determined by elemental analysis; the existence of the perovskite phase was confirmed by powder X-ray diffraction. Catalytic reactions of $CH_4 + O_2$ were run in a 14 mm ID × 140 mm length quartz reactor; 2.0 g of pelleted catalyst (40/60 mesh) was mixed with 4 g of 50 mesh quartz chips and loaded into the reactor along with additional pre- and post-beds of quartz sufficient to fill the reactor volume. Feed gases were delivered at atmospheric pressure from mass flow controllers and the temperature in the catalyst bed was measured through a central quartz thermowell. The catalysts were conditioned at the operating temperature for the reaction for 1 h under $O_2$(10-25 cc/min) prior to starting the feed flow. Background runs were performed using the identical experimental apparatus, with the reactor fill with only 50 mesh quartz chips. Reaction conditions and feed rates are summarized in Table 1. The effluent from the reactor was passed through a chilled trap ($-3°$ C.) and the product gas was analyzed on a Carle refinery gas analyzer.

For the catalytic experiments, mass balances demonstrated that the non-condensible, gaseous product contained ≧95% of the constituent hydrogen and oxygen atoms of the feed, indicating that no appreciable amount of $H_2O$ was produced in the reaction. The carbon selectivity to coke was determined from the difference between the quantity of carbon in the converted methane vs. the quantity of carbon evolved in the gaseous product. CO and $CO_2$ were the only carbon-containing products in the gas phase of the catalytic reactions.

Table 1 presents results for this partial oxidation reaction, catalyzed by the perovskite catalyst, under two different sets of conditions. In run A, a high $CH_4/O_2$ ratio was used at a temperature of 720° C. This was 100% selective for the production of $H_2$ and CO, and gave a product with an $H_2/CO$ ratio of 2.0 in accord with the following equation:

$$CH_4 + 0.5\ O_2 \rightarrow CO + 2\ H_2$$

Run B utilized a lower $CH_4/O_2$ ratio and was performed at the higher temperature of 820° C. In this instance the $H_2/CO$ ratio of the product is 3.1. The carbon and oxygen selectivities show that the partial oxidation reaction is the major route of methane conversion and is the source of the majority of the product $H_2$ The remaining $H_2$ is produced from coking of methane. It is particularly noteworthy that the oxygen selectivity to CO is ≧97% for both examples.

Suitable background runs at 720.C indicated there is no thermal $CH_4$ or $O_2$ conversion under the flow rates and $O_2$ content employed in run A. Non-catalytic experiments were also conducted under conditions analogous to run B. The results for one such run which achieved 100% $O_2$ conversion at 850° C. are presented in Table 1. In comparison to the catalytic experiment B, the homogeneous reaction has a lower CO carbon selectivity because it produces greater proportions of $CO_2$ and $C_{2+}$ hydrocarbons. The homogeneous reaction also has a much lower oxygen selectivity to CO vs. the catalytic run B, with much more of the oxygen going to $CO$ and $H_2$. The greater extent of water production reduces the $H_2/CO$ ratio in this instance.

TABLE I

| Partial Oxidation of Methane to CO and $H_2$ | | | |
|---|---|---|---|
| Run # | A | B | Non-catalytic |
| $CH_4/O_2$ (cc/min) | 390/10 | 39/11 | 39/11 |
| GHSV ($h^{-1}$) | 27,400 | 3,400 | — |
| Temperature (°C.) | 720 | 820 | 850 |
| Pressure (atm) | 1 | 1 | 1 |
| $CH_4$ conv. | 4.9 | 93.1 | 23.5 |
| $O_2$ conv. | 100.0 | 100.0 | 100.0 |
| CO carbon sel. | 100.0 | 60.9 | 48.2 |
| $CO_2$ carbon sel. | 0.0 | 0.7 | 25.3 |
| $C_{2+}$ carbon sel. | 0.0 | 0.0 | 26.5 |
| coke carbon sel.[a] | 0.0 | 38.4 | 0.0 |
| CO oxygen sel. | 100.0[b] | 97.8[b] | 21.4[c] |
| $CO_2$ oxygen sel. | 0.0[b] | 2.2[b] | 22.5[c] |
| $H_2/CO$ | 2.0 | 3.1 | 0.49 |

[a]Coke selectivity was determined from the difference between the quantity of carbon in the converted methane vs. the quantity of carbon evolved in the gaseous product.
[b]For the catalytic experiments, mass balances demonstrated that the non-condensible, gaseous product contained ≧ 95% of the constituent hydrogen and oxygen atoms of the feed, indicating that no appreciable amount of $H_2O$ was produced in the reaction.
[c]For the non-catalytic run at 850° C., the gaseous product only contained 44% of the constituent oxygen atoms of the feed, and only 88.5% of the constituent hydrogen of the feed. The remaining oxygen and hydrogen were assumed to be present in aqueous condensate of the low temperature trap; prior analyses have shown this condensible product to be essentially $H_2O$.

What is claimed is:

1. A process for the partial oxidation of methane, said process comprising contacting methane and oxygen with a perovskite of the formula $ABO_3$, where A is at least one metal atom capable of occupying the 12-coordinate sites of the perovskite and B is at least one metal atom capable of occupying the 6-coordinate sites of the perovskite, wherein methane and oxygen are contacted with said perovskite under conditions sufficient to convert said methane and oxygen to a mixture of carbon monoxide and hydrogen, and wherein methane and oxygen are contacted with said perovskite at a temperature of from about 600° C. to about 900° C.

2. A process according to claim 1, wherein the source of oxygen is air.

3. A process according to claim 1, wherein the source of methane is natural gas.

4. A process according to claim 1, wherein the ratio of methane to oxygen which is contacted with said perovskite is from about 1:1 to about 100:1 by volume.

5. A process according to claim 1, wherein methane and oxygen are contacted with said perovskite at a pressure of from about 0.1 atm to about 100 atm.

6. A process according to claim 5, wherein methane is contacted with said perovskite at a gas hourly space velocity of from about 100 to about 300,000.

7. A process according to claim 1, wherein the mole ratio of carbon monoxide product to hydrogen product is from about 1.0 to about 4.0.

8. A process according to claim 1, wherein the conversion of methane is from about 0.1% to about 95%.

9. A process according to claim 8, wherein the weight ratio of carbon dioxide produced to carbon monoxide produced is from about 0 to about 0.5.

10. A process according to claim 1, wherein A is selected from the group of elements consisting of La, Ca, Sr, Ba, Na, K, Ag, Cd and mixtures thereof.

11. A process according to claim 10, wherein B is selected from the group of elements consisting of Ta, Co, Ti, Ga, Nb, Fe, Ni, Mn, Cr, V, Al, Th, Pb, Sn, Mo, Zr and mixtures thereof.

12. A process according to claim 1, wherein A comprises La.

13. A process according to claim 12, wherein B is Co.

14. A process according to claim 13, wherein A is La.